United States Patent
Bonalle et al.

(10) Patent No.: US 8,070,058 B2
(45) Date of Patent: *Dec. 6, 2011

(54) WIRELESS TRANSACTION MEDIUM HAVING COMBINED MAGNETIC STRIPE AND RADIO FREQUENCY COMMUNICATIONS

(75) Inventors: David S. Bonalle, New Rochelle, NY (US); Michael D. Donovan, Phoenix, AZ (US); Sherrie G. Jackson, Phoenix, AZ (US); Scott Glen Paylor, Glendale, AZ (US); Medina J. Senghore, Brentwood, NJ (US); Tracey R. Thomas, Boonton, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/031,548

(22) Filed: Feb. 21, 2011

(65) Prior Publication Data
US 2011/0139869 A1   Jun. 16, 2011

Related U.S. Application Data

(63) Continuation of application No. 11/738,823, filed on Apr. 23, 2007, now Pat. No. 7,909,247.

(60) Provisional application No. 60/863,320, filed on Oct. 27, 2006.

(51) Int. Cl.
*G06K 19/00* (2006.01)
(52) U.S. Cl. ............... 235/380; 235/375; 235/379
(58) Field of Classification Search .......... 235/375, 235/379, 380
See application file for complete search history.

(56) References Cited

U.S. PATENT DOCUMENTS

| | | | |
|---|---|---|---|
| 3,790,768 A | 2/1974 | Chevalier et al. | |
| 6,338,048 B1 | 1/2002 | Mori | |
| 6,715,679 B1 | 4/2004 | Infosino | |
| 7,004,385 B1 | 2/2006 | Douglass | |
| 7,909,247 B2* | 3/2011 | Bonalle et al. | 235/380 |
| 2005/0071231 A1 | 3/2005 | Bennau et al. | |
| 2005/0077349 A1 | 4/2005 | Bonalle et al. | |
| 2008/0029607 A1* | 2/2008 | Mullen | 235/492 |

OTHER PUBLICATIONS

USPTO; Office Action dated Apr. 20, 2009 in U.S. Appl. No. 11/738,823.
USPTO; Final Office Action dated Oct. 14, 2009 in U.S. Appl. No. 11/738,823.
USPTO; Advisory Action dated Dec. 29, 2009 in U.S. Appl. No. 11/738,823.
USPTO; Office Action dated Jun. 7, 2010 in U.S. Appl. No. 11/738,823.
USPTO; Notice of Allowance dated Nov. 12, 2010 in U.S. Appl. No. 11/738,823.

* cited by examiner

*Primary Examiner* — Michael G Lee
*Assistant Examiner* — Matthew Mikels
(74) *Attorney, Agent, or Firm* — Snell & Wilmer L.L.P.

(57) ABSTRACT

A wireless financial transaction instrument, such as a card, has a magnetic stripe, a display, and an on-board power supply, such as a battery, and is usable with a dual capture point of sale terminal. Information is received by such a terminal from the card wirelessly, and also from the magnetic stripe, and the data received contactlessly is preferably used to verify that read from the stripe. The display can display the account number on command, or to display a current balance, or amount of credit remaining, or any combination of these items of information.

20 Claims, 8 Drawing Sheets

WIRELESS TRANSACTION MEDIUM HAVING COMBINED MAGNETIC STRIPE AND RADIO FREQUENCY COMMUNICATIONS

RELATED APPLICATIONS

This application is a continuation of, claims priority to and the benefit of, U.S. Ser. No. 11/738,823 filed on Apr. 23, 2007 and entitled "WIRELESS TRANSACTION MEDIUM HAVING COMBINED MAGNETIC STRIPE AND RADIO FREQUENCY COMMUNICATIONS." The '823 application claims benefit of the filing date of, and incorporates by reference the entire contents of Provisional Patent Application No. 60/863,320, filed Oct. 27, 2006. Both of which are incorporated by reference herein in their entirety.

BACKGROUND OF THE INVENTION

Field of the Invention

The present invention generally relates to a point of sale device/terminal that can read magnetic stripe data and receive contactless transaction data from a transaction instrument, and more specifically relates to such a system that utilizes a battery-powered wireless card or other transaction instrument and provides the user with a visual display. The transaction instrument is preferably a financial transaction instrument, but is not limited thereto.

Fraud is a growing problem that has always existed at some level. Credit card providers have worked to reduce fraud by requiring such features as zip code verification and signatures, both of which slow down transaction speed and convenience.

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a contactless fob, card or tag for use in completing financial transactions. Such a fob or card may have a traditional or non-traditional form factor and also (if it is a card) has a magnetic stripe, which stores account data, for example, in accordance with ISO/IEC 7813. A typical RFID card includes a transponder and is ordinarily a self-contained device which may be contained on any portable form factor. In some instances, a battery may be included with the card to power the transponder. In which case the internal circuitry of the card (including the transponder) may draw its operating power from the battery power source. Alternatively, the card may exist independent of an internal power source. In this instance the internal circuitry of the card (including the transponder) may gain its operating power directly from an RF interrogation signal. U.S. Pat. No. 5,053,774 issued to Schuermann describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

One of the more visible uses of the RFID technology is found in the introduction of Exxon/Mobil's Speedpass and Shell's EasyPay products. These products use transponders placed in a fob or tag which enables automatic identification of the user when the fob is presented at a Point of Sale (POS) device. Fob identification data is typically passed to a third party server database, where the identification data is referenced to a customer (e.g., user) credit or debit account. In an exemplary processing method, the server seeks authorization for the transaction by passing the transaction and account data to an authorizing entity. Once authorization is received by the server, clearance is sent to the point of sale device for completion of the transaction. In this way, the conventional transaction processing method involves an indirect path which causes undue overhead due to the use of the third-party server.

Given the foregoing, what is needed is a transaction instrument, such as a financial transaction instrument, having a magnetic stripe and also having the ability to operate in a contactless fashion, and capable of operating with a point of sale device/terminal that can read magnetic stripe data, or can receive contactless transaction data from a financial transaction instrument, or both, and having a display, and a power supply adequate to power the various functions of the instrument.

SUMMARY OF THE INVENTION

The present invention meets the above-identified needs by providing a wireless transaction instrument, such as a financial transaction card, also having a magnetic stripe, having a display, and having an on-board power supply, such as a battery, capable of providing the required power for the card's various functions. The card preferably complies with the EMV standards for contactless cards, and is usable with a dual capture point of sale terminal, like that disclosed in parent A. No. 60/863,320, filed Oct. 27, 2006. In particular, information is received by such a terminal from the card wirelessly, and also from the magnetic stripe, and the data received contactlessly is preferably used to verify that read from the stripe. As an alternative approach that is also within the broad scope of the invention, the card has dual capability, and can be used with either a conventional contactless terminal or a conventional magnetic-stripe reader.

The display can be used in various ways within the broad scope of the invention, and can, by way of example, be used to display the account number but only on command, so as to protect the secrecy of the number, or to display a current balance, or amount of credit remaining, or any combination of these items of information.

The dual capture terminal is preferably able simultaneously to read the data from the magnetic stripe and contactless chip on a transaction card to determine the card's legitimacy. If the data elements from the two sources do not match, the card transaction would be declined and the merchant would be prompted to confiscate the counterfeit card. The radio frequency reader, which may be referred to as a radio frequency identification (RFID) reader and which reads the contactless transaction data, should be placed within about 10 cm of the magnetic stripe swipe, so that the device can gather the data from both sources simultaneously.

Furthermore, IA codes may be updated to contain data that indicate that a card has a contactless chip. Either the terminal or the authorization system will then do a security check to make sure the card does in fact have a radio frequency chip. This security feature will prevent fraudsters from breaking a chip or rewriting magnetic stripe data to indicate that the fraudulent card does not have a contactless chip.

Another advantage of the present invention is that consumers still may swipe the card, but as the card is being passed through the terminal it will actually complete the transaction using radio frequency. Consumers may not even know that their transaction was processed using contactless rather than traditional magnetic stripe, which will help speed the migration to more secure contactless payment systems.

Another advantage of the present invention is a reduction of payouts for fraudulent transactions to merchants and a reduction in customer service costs associated with processing these fraudulent claims. The present invention makes the contactless transaction value proposition even stronger for merchants, thus providing incremental benefits in merchant value and accelerating the adoption of contactless payment systems.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 1:
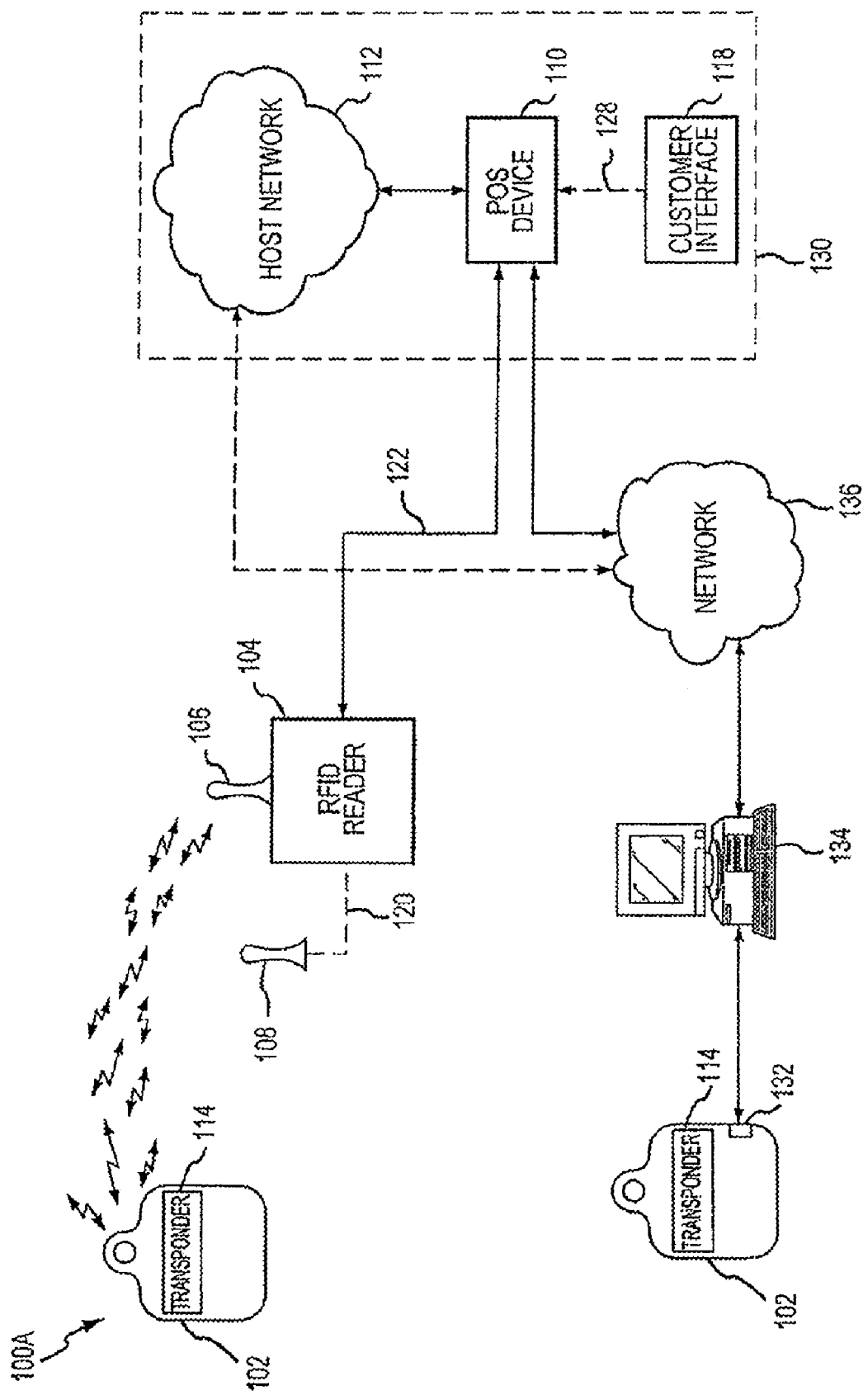
FIG. 1 illustrates an exemplary RFID-based system in accordance with the present invention, wherein exemplary components used for contactless card transaction completion are depicted.

The present invention is directed to a transaction instrument (hereinafter termed "card" for brevity, but not limited to having the faun of any particular known instrument, provided only that the instrument is able to perform the functions described herein); and preferably a financial transaction instrument, having a display, and having both a magnetic stripe that stores magnetic stripe data and a contactless chip that stores contactless transaction data. The present invention is now described in more detail herein in terms of an exemplary embodiment. This is for convenience only and is not intended to limit the application of the present invention. In fact, after reading the following description, it will be apparent to one skilled in the relevant art(s) how to implement the following invention in alternative embodiments.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "user," "end user", "consumer", "customer," "participant," and/or the plural form of these terms are used interchangeably throughout herein to refer to those persons or entities capable of accessing, using, being affected by and/or benefiting from the present invention.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

The card may be a traditional plastic transaction card, titanium-containing, or another metal-containing, transaction card, clear and/or a translucent transaction card, a foldable or otherwise unconventionally-sized transaction card, or other types of transaction cards, such as credit, charge, debit, prepaid or stored-value cards, or any other like financial or other transaction instrument. The card may also have electronic functionality provided by a network of electronic circuitry that is printed or otherwise incorporated onto or within the transaction instrument (and typically referred to as a "smart card").

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system.

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used as a unique identification of the customer, card holder or card member.

A merchant account number may be, for example, any number or alpha-numeric characters that identify a particular merchant for purposes of card acceptance, account reconciliation, reporting and the like.

As mentioned above, the financial transaction instrument or device of the invention is usable with the dual-capture POS terminal described in co-pending A. No. 60/863,320, and while the invention is by no means limited to use with such a terminal, the following description assumes knowledge and understanding of the disclosure in the mentioned co-pending application.

The magnetic stripe of the financial instrument may include data to tell the POS terminal that a contactless chip is present. The terminal should interact with the card to identify that it has a radio frequency chip, allowing the POS terminal to compare data between the magnetic stripe and the contactless chip while the swipe is occurring. The POS terminal may be able to read both simultaneously and validate the Track 1 and 2 data from the magnetic stripe against the information on the chip.

It should be noted that the transfer of information in accordance with the present invention may be done in a format recognizable by a merchant system or account issuer. In that regard, by way of example, the information may be transmitted from an RFID device to an RFID reader, or from the RFID reader to the merchant system in magnetic stripe or multitrack magnetic stripe format. Also, data may be read from a magnetic stripe of a contactless transaction card and compared to the information transmitted by RF.

Because of the proliferation of devices using magnetic stripe format, the standards for coding information in magnetic stripe format were standardized by the International Organization for Standardization in ISO/IEC 7811 (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portion of the tracks, while other portions of the tracks may have open data fields. The contents of each track and the formatting of the information provided to each track are controlled by the ISO/IEC 7813 standard. For example, the information must typically be encoded as binary data. Track 1 is usually encoded with user information (i.e., name) in alpha-numeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe format. For example, the counter values, authentication tags and encrypted identifiers described herein, may be forwarded encoded in all or a portion of a data stream representing data encoded in, for example, track 2 or track 3 format.

The present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

FIG. 1 illustrates an exemplary RFID/magnetic stripe transaction system 100A in accordance with the present invention, wherein exemplary components for use in completing a contactless card transaction are depicted. In general, the operation of system 100A may begin when card 102 (or a tag-type fob or other instrument having a magnetic stripe and the proper form factor to fit in a conventional card reading slot) is presented for payment, and is interrogated by RFID reader/magnetic stripe reader 104 and the magnetic stripe is read. Card 102 and RFID reader/magnetic stripe reader 104 may then engage in mutual authentication after which the transponder 102 may provide the transponder identification and/or account identifier to the RFID reader/magnetic stripe reader 104, both via RF and via the magnetic stripe reader, which may further provide the information to the merchant system 130 POS device 110.

System 100A may include a card 102 having a transponder 114 and a RFID reader/magnetic stripe reader 104 in RF communication with card 102.

The RFID reader/magnetic stripe reader 104 may be configured to communicate using a RFID internal antenna 106. Alternatively, RFID reader/magnetic stripe reader 104 may include an external antenna 108 for communications with card 102, where the external antenna may be made remote to the RFID reader/magnetic stripe reader 104 using a suitable cable and/or data link 120. RFID reader/magnetic stripe reader 104 may be further in communication with a merchant system 130 via a data link 122. The system 100A may include a transaction completion system including a point of interaction device such as, for example, a merchant point of sale (POS) device 110 or a computer interface (e.g., user interface) 134. In one exemplary embodiment the transaction completion system may include a merchant system 130 including the POS device 110 in communication with a RFID reader/magnetic stripe reader 104 (via data link 122).

Although the point of interaction device is described herein with respect to a merchant point of sale (POS) device, the invention is not to be so limited. Indeed, a merchant POS device is used herein by way of example, and the point of interaction device may be any device capable of receiving contactless and magnetic stripe account data. In this regard, the POS may be any point of interaction device enabling the user to complete a transaction using a card 102. POS device 110 may be in further communication with a customer interface 118 (via data link 128) for entering at least a customer identity verification information. In addition, POS device 110 may be in communication with a merchant host network 112 (via data link 124) for processing any transaction request. In this arrangement, information provided by RFID reader/magnetic stripe reader 104 is provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An "account number", as used herein, may include any identifier for an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express, Visa and/or MasterCard or the like. For ease in understanding, the present invention may be described with respect to a credit account. However, it should be noted that the invention is not so limited and other accounts permitting an exchange of goods and services for an account data value is contemplated to be within the scope of the present invention, and as noted above, the card is not limited to being for financial transactions at all.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. The account number is stored as Track 1 and Track 2 data as defined in ISO/IEC 7813, and further may be made unique to card 102. In one exemplary embodiment, the account number may include a unique card serial number and user identification number, as well as specific application applets. The account number may be stored in card 102 inside a database 214, as described more fully below. Database 214 may be configured to store multiple account numbers issued to the card 102 user by the same or different account providing institutions. Where the account data corresponds to a loyalty or rewards account, the database 214 may be configured to store the attendant loyalty or rewards points data.

Figure 1A:
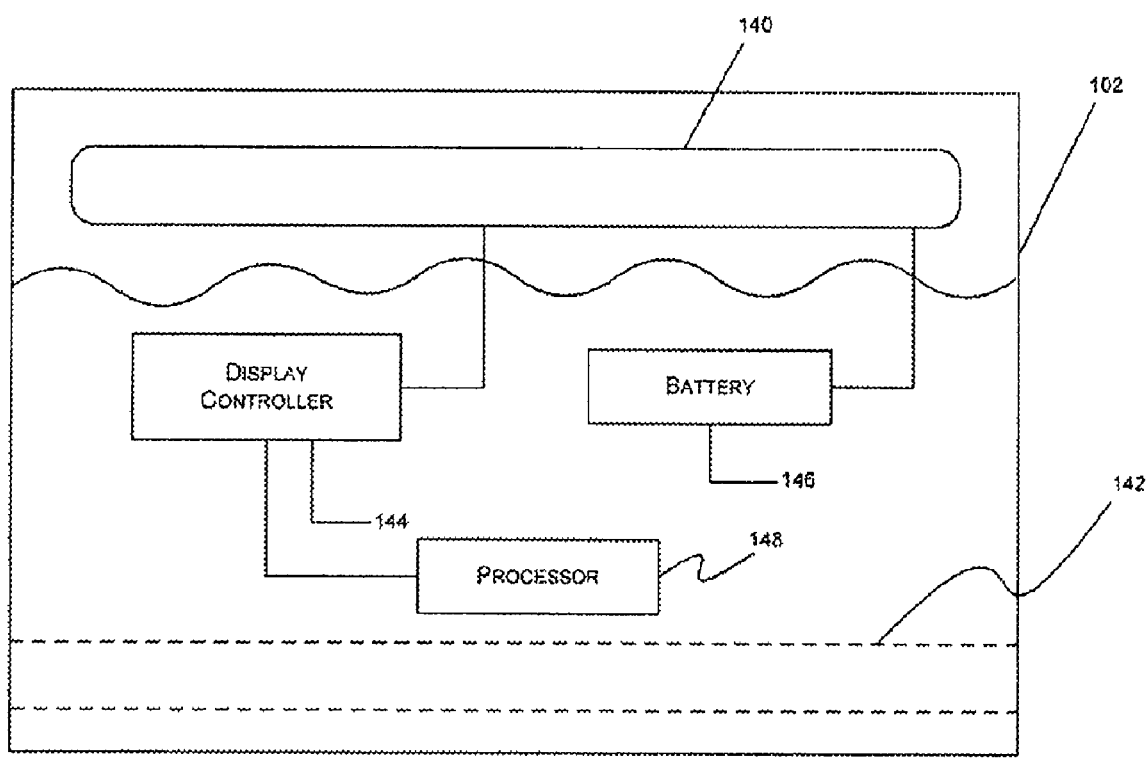
FIG. 1A is a schematic view, partly in section, of a financial transaction instrument according to one embodiment of the invention.
Figure 2:
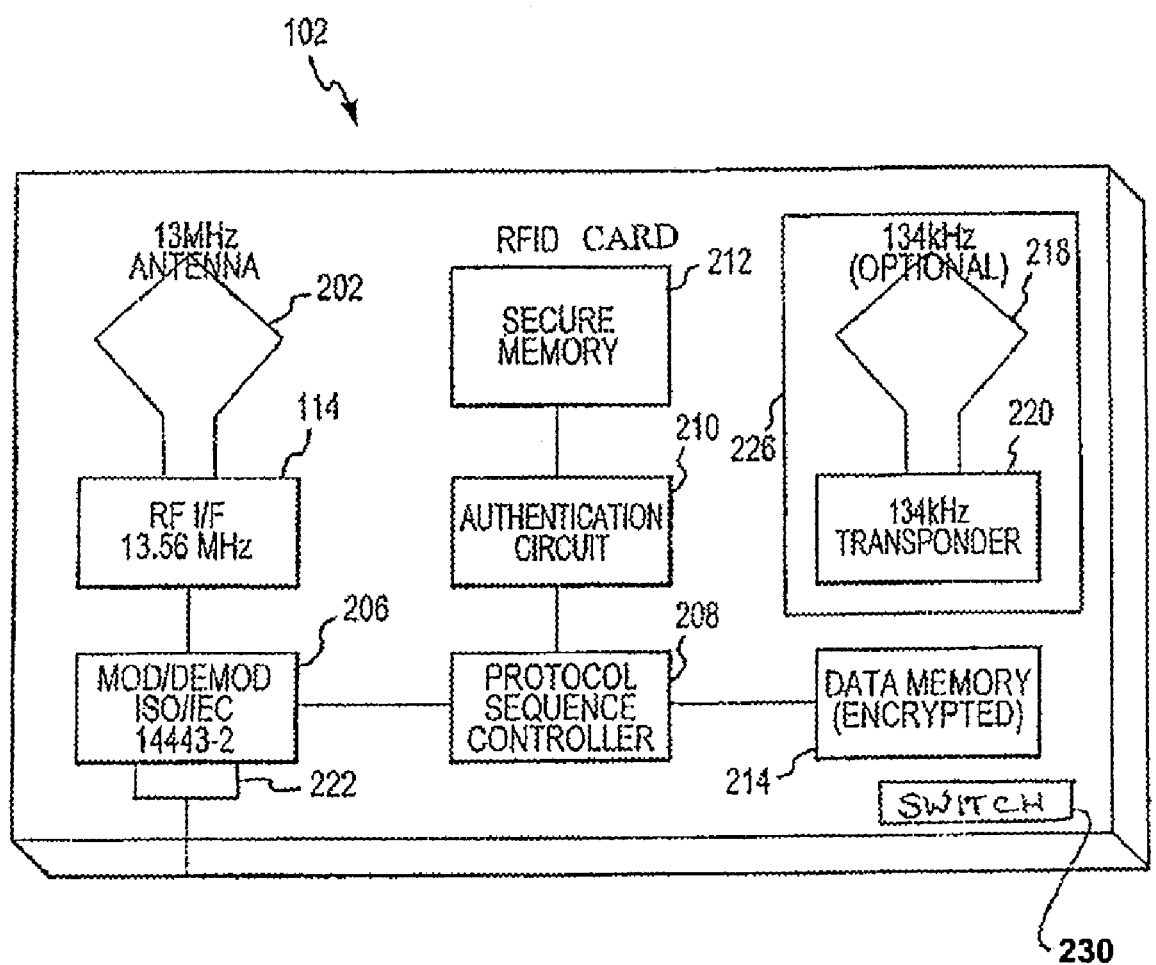
FIG. 2 is a schematic illustration of internal circuitry of an exemplary contactless card in accordance with the embodiment of FIG. 1A.

FIGS. 1A and 2 illustrate certain of the functional blocks of an exemplary card 102 in accordance with the present invention. Card 102 may be a contactless transaction card or other type of RFID device 102 which may be presented by the user to facilitate an exchange of funds or points, etc., for receipt of goods or services. As described herein, by way of example, card 102 may be a contactless transaction card which includes a magnetic stripe 142 (indicated by the dotted lines in FIG. 1A) and which may be presented for facilitating payment for goods and/or services.

Card 102 is provided with a display 140 at one surface. Display 140 may employ any convenient programmable display technology. Examples are light-emitting diodes, liquid crystals, low-energy plasma devices, electroluminescent devices, or any other type of display that can be controlled electronically. Also provided in card 102 is a display controller 144, which determines what information is currently displayed. Such circuitry is well understood by those in the art, and hence further description will be omitted.

Also provided is an on-board power source, shown exemplarily as battery 146. While it is known for contactless cards to operate on energy received when the card is interrogated, the amount of energy received in that fashion may be too minute to power a display, and for this reason the battery 146 has been provided. Many kinds of batteries are well known to those in the art, and any suitable type may be used without departing from the invention. In particular, battery 146 is preferably a disposable one that can be relied upon to last for the normal lifetime of a card, or even longer, but it may alternatively be a rechargeable or replaceable battery. If a rechargeable battery is used, then of course card 102 is also provided with an electrical port by means of which battery 146 can be connected to a charging unit, while if battery 146 is replaceable, then card 102 is provided with a removable portion to permit access to the battery to replace it. Such port and such removable portion, however, are not illustrated.

In the preferred embodiment, card 102 also is provided with circuitry and other physical elements as described below that make it possible to rewrite at least a portion of the information stored in magnetic stripe 142. In the example described herein, it is assumed that four digits of the account number are modified from time to time, but it is within the scope of the invention the number of digits that are modifiable to be larger or smaller than four.

Generally, the means provided for modifying the information stored in the magnetic stripe 142, and in particular certain digits of the account number, include small magnetic write heads located within card 102 itself, powered by the on-board power source 146. When it is determined during the operation of card 102 that the account number ought to be modified, and a new account number is generated to replace the existing one, then the write heads are selectively activated to overwrite the portions of magnetic stripe 142 that store the digits of the account number that are being changed. Details of the structure of such on-card write heads, and of the circuitry required to control the heads, are believed to be within the scope of those skilled in the relevant arts, and will not be elaborated herein. For examples of descriptions of on-card or other write heads and their control the reader is referred to U.S. Patent Application Publication 2006/0192006 A1 and U.S. Pat. No. 7,044,394, the entire disclosures of which are incorporated herein by reference.

Also present in card 102 is a processor 148, the functions of which are described below. While processor 148 is illustrated as a separate block from the elements shown in the block diagram of FIG. 2, the hardware used as processor 148 and that used as certain of the blocks in FIG. 2 may in fact be the same, in whole or in part.

Card 102 may include an antenna 202 for receiving an interrogation signal from RFID reader/magnetic stripe reader 104 via antenna 106 (or alternatively, via external antenna 108). Card antenna 202 may be in communication with a transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader/magnetic stripe reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader/magnetic stripe reader 104, and for facilitating control of the sending of the card account number. In this regard, protocol/sequence controller 208 may be any suitable digital or logic driven circuitry capable of facilitating determination of the sequence of operation for the card inner circuitry. For example, protocol/sequence controller 208 may be configured to determine whether the signal provided by the RFID reader/magnetic stripe reader 104 is authenticated, and thereby providing to the RFID reader/magnetic stripe reader 104 the account number stored on card 102.

Protocol/sequence controller 208 may further be in communication with authentication circuitry 210 for facilitating authentication of the signal provided by RFID reader/magnetic stripe reader 104. Authentication circuitry may be further in communication with a non-volatile secure memory database 212. Secure memory database 212 may be any suitable elementary file system, such as that defined by ISO/IEC 7816-4, or any other elementary file system allowing a lookup of data to be interpreted by the application on the chip. Database 212 may be any type of database, such as relational, hierarchical, object-oriented, or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader/magnetic stripe reader 104 by association of the RFID signal to authentication keys stored on database 212. Encryption circuitry may use keys stored on database 212 to perform encryption and/or decryption of signals sent to or from the RFID reader/magnetic stripe reader 104.

In addition, protocol/sequence controller 208 may be in communication with a database 214 for storing at least card account data, and a unique card identification code for card 102. Protocol/sequence controller 208 may be configured to retrieve the account number from database 214 as desired. Database 214 may be of the same configuration as database 212 described above. The card account data and/or unique card identification code stored on database 214 may be encrypted prior to storage. Thus, where protocol/sequence controller 208 retrieves the account data, and or unique card identification code from database 214, the account number may be encrypted when being provided to RFID reader/magnetic stripe reader 104. Further, the data stored on database 214 may include, for example, an unencrypted unique card identification code, a user identification, Track 1 and 2 data, as well as specific application applets.

Card 102 may include means for enabling activation of the card by the user. In one exemplary embodiment, a switch 230 which may be operated by the user of the card 102. The switch 230 on card 102 may be used to selectively or inclusively activate the card 102 for particular uses. In this context, the teen "selectively" may mean that the switch 230 enables the user to place the card 102 in a particular operational mode. For example, the user may place the card 102 in a mode for enabling purchase of a good or of a service using a selected account number. In addition, the term "inclusively" may mean that the card 102 is placed in an operational mode permitting the card 102 to be responsive to the RF interrogation and interrogation via the USB connector 132. In one particular embodiment, the switch 230 may remain in an OFF position to ensure that one or more applications or accounts associated with the card 102 are non-reactive to any commands issued by RFID reader/magnetic stripe reader 104. As used herein, the OFF position may be termed the "normal" position of the activation switch 230, although other normal positions are contemplated.

In another exemplary embodiment, when the switch 230 is moved from the OFF position, the card 102 may be deemed activated by the user. That is, the switch 230 may activate internal circuitry in card 102 for permitting the card to be responsive to RF signals (e.g., commands from RFID reader/magnetic stripe reader 104). In this way, switch 230 may facilitate control of the active and inactive states of the card 102. Such control increases the system security by preventing inadvertent or illegal use of the card 102.

In one exemplary embodiment, switch 230 may be a simple mechanical device in communication with circuitry which may electrically prevent the card from being powered by a RFID reader/magnetic stripe reader. That is, when switch 230 is in its normal position, switch 230 may provide a short to the card 102 internal circuitry, preventing card 102 from being responsive to interrogation by RF or via the USB connector 230. In this arrangement, the switch 230 may be, for example, a "normally closed" (NC) configured switch, which may be electrically connected to the antenna 202 at the interface of the antenna 202 and the transponder 114. The switch 230 may be depressed, which may open the switch 230 fully activating the antenna 202.

In yet another embodiment, the switch 230 may be a logic switch. Where switch 230 is a logic switch the switch control software may be read from the sequence controller 208 to selectively control the activation of the various card 102 components.

Also, while the user can turn card 102 on or off by means of the switch, the processor may also be programmed to turn the display off a set time after activation.

Moreover, switch 230 has been described as having an OFF position and another position, but it is not limited to having only two positions, and may in fact have three or more, or may be implemented as an array of individual switches, such that by placing each in a respective position the user selects among whatever number of operational states or modes it is desired to permit the user to activate. In addition, as mentioned, the user may employ switch 230 to activate display and other functions of card 102, and thereafter all or some of these functions will shut down after the lapse of a preset length of time. Moreover, switch 230 may be a mechanical, electromechanical, capacitance or other known type of switch, a logic switch, or a biometric device that causes activation of card 102 upon recognizing a predetermined biometric of the user. The implementation of these various types of switch are believed to be within the ordinary skill in the relevant arts, and hence will not be described.

Figure 3:
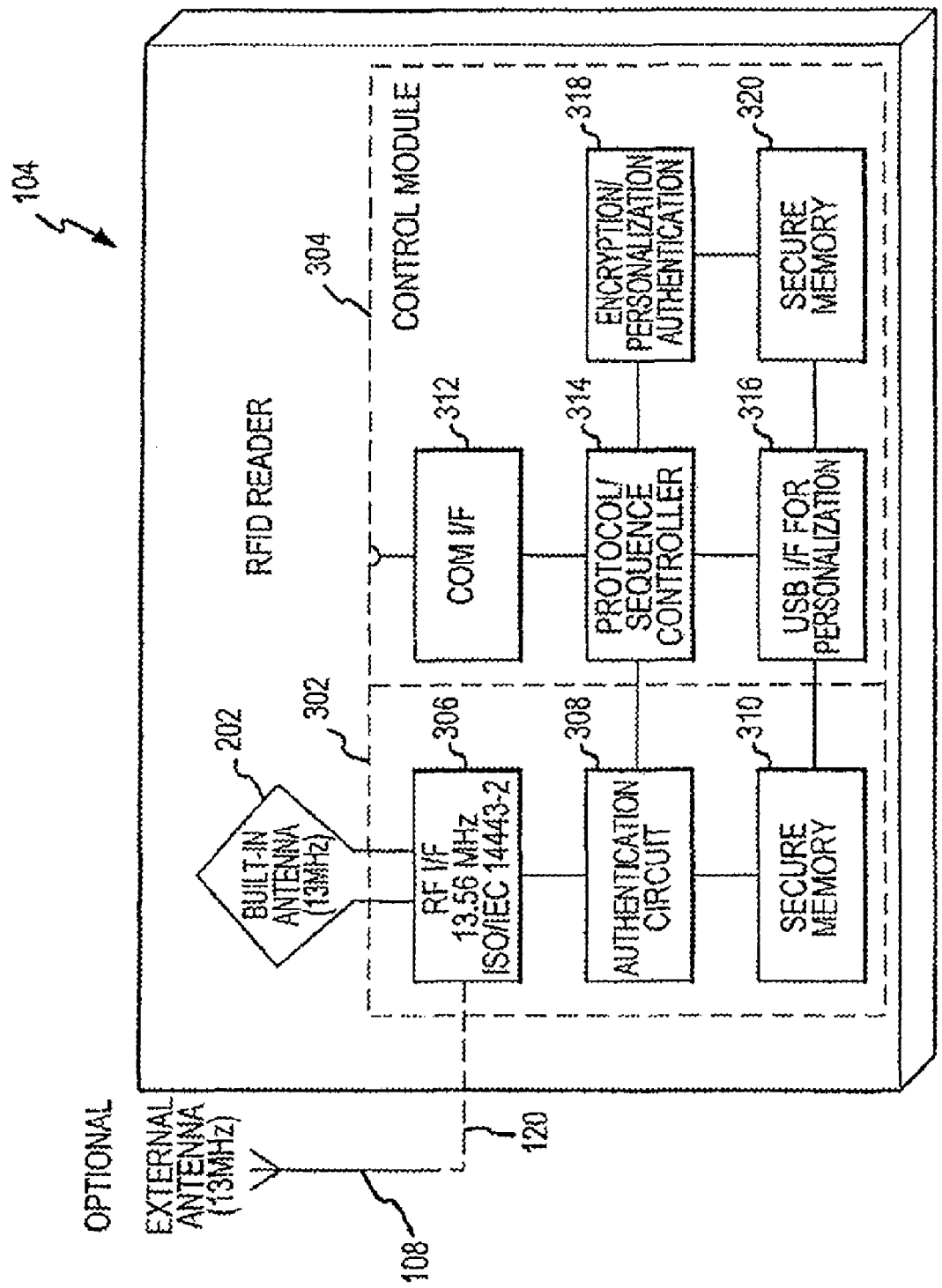
FIG. 3 is a schematic illustration of an exemplary RFID reader/magnetic stripe reader with which the embodiment of FIG. 1A can be used.

FIG. 3 illustrates an exemplary block diagram of a RFID reader/magnetic stripe reader 104 that can be used with the card of the present invention. RFID reader/magnetic stripe reader 104 includes, for example, an antenna 106 coupled to a RF module 302, which is further coupled to a control module 304. In addition, RFID reader/magnetic stripe reader 104 may include an antenna 108 positioned remotely from the RFID reader/magnetic stripe reader 104 and coupled to RFID reader/magnetic stripe reader 104 via a suitable cable 120, or other wire or wireless connection.

RF module 302 and antenna 106 may be suitably configured to facilitate communication with card 102. Where card 102 is formatted to receive a signal at a particular RF frequency, RF module 302 may be configured to provide an interrogation signal at that same frequency. For example, in one exemplary embodiment, card 102 may be configured to respond to an interrogation signal of about 13.56 MHz. In this case, RFID antenna 106 may be 13 MHz and may be configured to transmit an interrogation signal of about 13.56 MHz. That is, card 102 may be configured to include a first and second RF module (e.g., transponder) where the first module may operate using a 134 kHz frequency and the second RF module may operate using a 13.56 MHz frequency. The RFID reader/magnetic stripe reader 104 may include two receivers which may operate using the 134 kHz frequency, the 13.56 MHz frequency or both. When the reader 104 is operating at 134 kHz frequency, only operation with the 134 kHz module on the card 102 may be possible. When the reader 104 is operating at the 13.56 MHz frequency, only operation with the 13.56 MHz module on the card 102 may be possible. Where the reader 104 supports both a 134 kHz frequency and a 13.56 MHz RF module, the card 102 may receive both signals from the reader 104. In this case, the card 102 may be configured to prioritize selection of the one or the other frequency and reject the remaining frequency. Alternatively, the reader 104 may receive signals at both frequencies from the card upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform the card user that the transaction is initiated (e.g., card is being interrogated), the card is valid (e.g., card is authenticated), transaction is being processed, (e.g., card account number is being read by RFID reader) and/or the transaction is accepted or denied (e.g., transaction approved or disapproved). Such an optional feedback may or may not be accompanied by an audible indicator (or may present the audible indicator singly) for informing the card user of the transaction status. The audible feedback may be a simple tone, multiple tones, musical indicator, and/or voice indicator configured to signify when the card 102 is being interrogated, the transaction status, or the like.

RFID antenna 106 may be in communication with a transponder 306 for transmitting an interrogation signal and receiving at least one of an authentication request signal and/or an account data from card 102. Transponder 306 may be of similar description as transponder 114 of FIG. 2. In particular, transponder 306 may be configured to send and/or receive RF signals in a format compatible with antenna 202 in similar manner as was described with respect to card transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the card 102 which are authorized to transact business over system 100. Database 310 may additionally store RFID reader/magnetic stripe reader 104 identifying information for providing to card 102 for use in authenticating whether RFID reader/magnetic stripe reader 104 is authorized to be provided the card account number stored on card database 214.

Authentication circuitry 308 may be of similar description and operation to authentication circuitry 210. That is, authentication circuitry 308 may be configured to authenticate the signal provided by card 102 in similar manner that authentication circuitry 210 may be configured to authenticate the signal provided by RFID reader/magnetic stripe reader 104.

As is described more fully below, card 102 and RFID reader/magnetic stripe reader 104 engage in an authentication process in which reader 104 uses the information obtained wirelessly from card 102 to verify the information read form magnetic stripe 142 of card 102.

Figure 4:
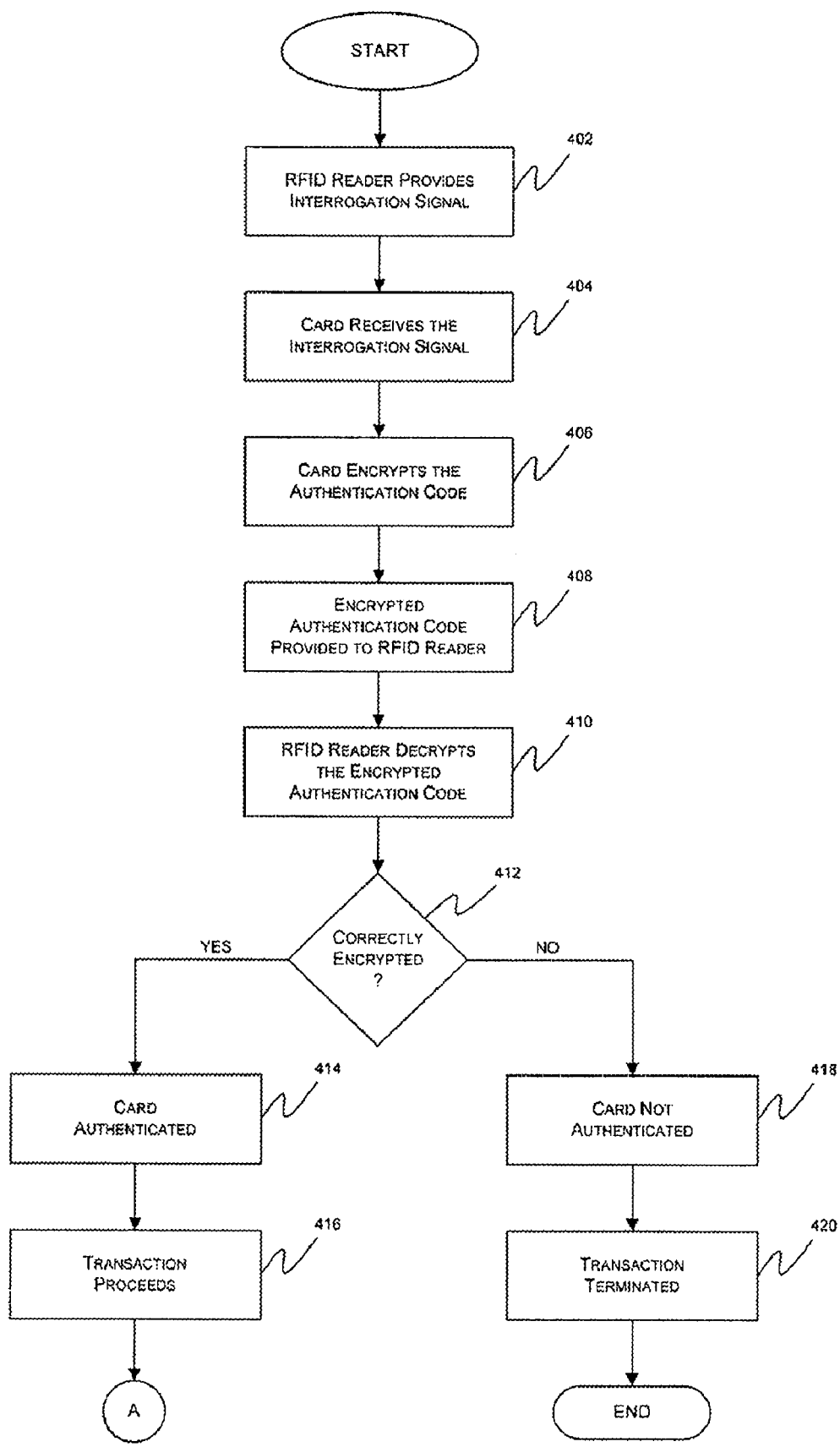
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of the RFID reader/magnetic stripe reader 104 authenticating the card 102, although similar steps may be followed in the instance that card 102 authenticates RFID reader/magnetic stripe reader 104.

As noted, database 212 may store security keys for encrypting or decrypting signals received from RFID reader/magnetic stripe reader 104. In an exemplary authentication process, where RFID reader/magnetic stripe reader 104 is authenticating card 102, RFID reader/magnetic stripe reader 104 may provide an interrogation signal to card 102 (step 402). The interrogation signal may include a random code generated by the RFID reader/magnetic stripe reader authentication circuit 210, which is provided to the card 102 and which is encrypted using an unique encryption key corresponding to the card 102 unique identification code. For example, the protocol/sequence controller 314 may provide a command to activate the authentication circuitry 308. Authentication circuitry 308 may provide from database 310 a card interrogation signal including a random number as a part of the authentication code generated for each authentication signal. The authentication code may be an alphanumeric code which is recognizable (e.g., readable) by the RFID reader/magnetic stripe reader 104 and the card 102. The authentication code may be provided to the card 102 via the RFID RF interface 306 and antenna 106 (or alternatively antenna 108).

Card 102 receives the interrogation signal (step 404). The interrogation signal including the authorization code may be received at the RF interface 114 via antenna 202. Once the card 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of the card 102, and provide the authentication code to authentication circuit 210. The card 102 may then encrypt the authentication code (step 406). In particular, encryption may be done by authentication circuit 210, which may receive the authentication code and encrypt the code prior to providing the encrypted authentication code to protocol/sequence controller 208. Card 102 may then provide the encrypted authentication code to the RFID reader/magnetic stripe reader 104 (step 408). That is, the encrypted authentication code may be provided to the RFID reader/magnetic stripe reader 104 via modulator/demodulator circuit 206, RF interface 114 (e.g., transponder 114) and antenna 202.

RFID reader/magnetic stripe reader 104 may then receive the encrypted authentication code and decrypt it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the card 102 unique identification code. For example, the encrypted authentication code may be provided along with the unique card 102 identification code. The authentication circuit may receive the card 102 unique identification code and retrieve from the database 310 a transponder system decryption key correlative to the unique card 102 identification code for use in decrypting the encrypted authentication code.

Figure 4A:
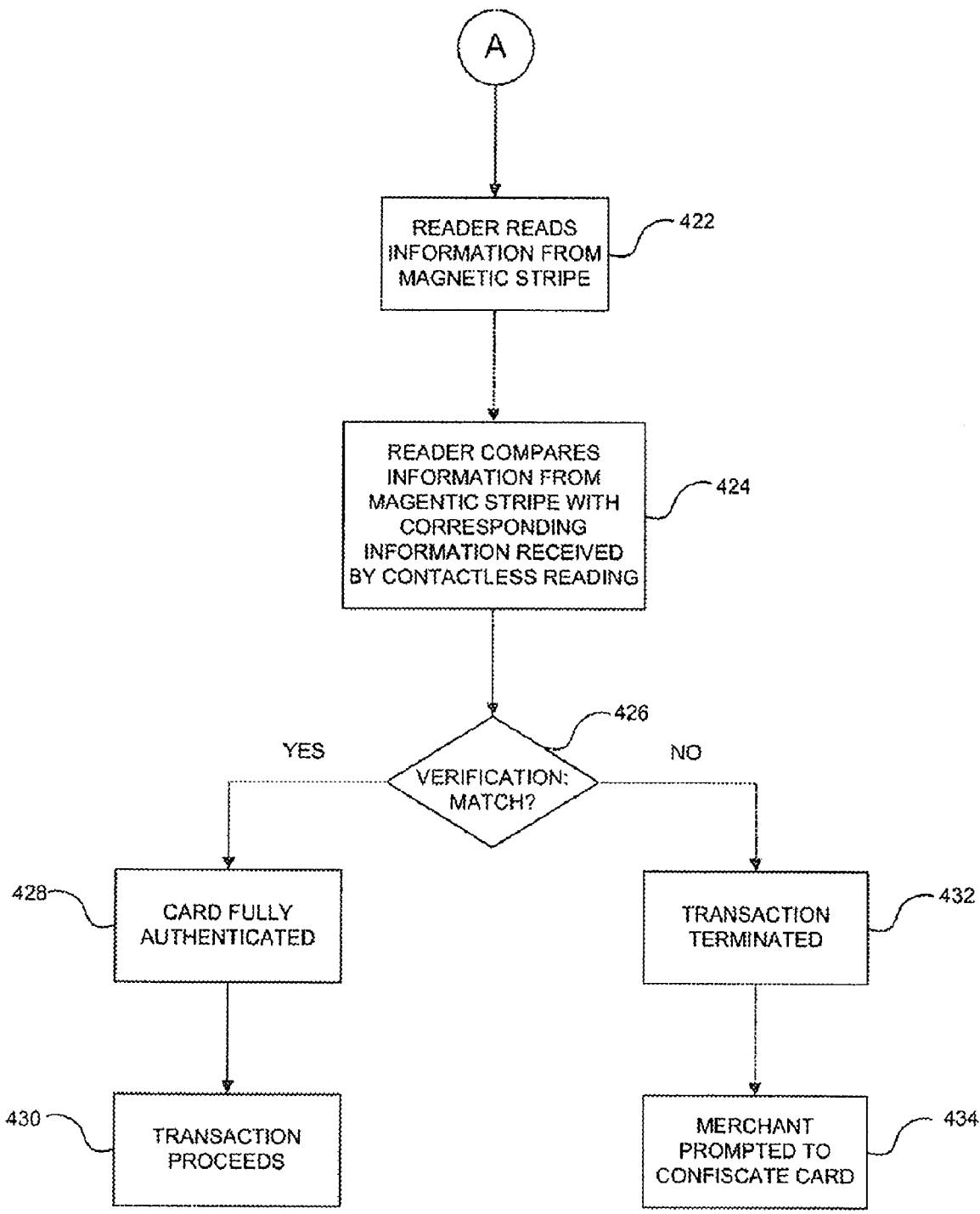
FIG. 4A is an exemplary flow diagram of additional comparison and verification processing in accordance with a preferred embodiment of the present invention.

Once the authentication code is decrypted, the decrypted authentication code is compared to the authentication code provided by the RFID reader/magnetic stripe reader 104 at step 402 (step 412) to verify its authenticity. If the decrypted authorization code is not readable (e.g., recognizable) by the authentication circuit 308, the card 102 is deemed to be unauthorized (e.g., unverified) (step 418) and the operation of system 100 is terminated (step 420). Contrarily, if the decrypted authorization code is recognizable (e.g., verified) by the card 102, the decrypted authorization code is deemed to be authenticated (step 414), and the transaction is allowed to proceed (step 416). Preferably, however, before the transaction proceeds, further verification processing occurs, as illustrated in FIG. 4A.

In an exemplary verification process, the authorization circuit 308 may determine whether the unlocked authorization code is identical to the authorization code provided in step 402. If the codes are not identical then the card 102 is not authorized to access system 100. Although the verification process is described with respect to identicality being used as the verification test, identicality is not the only test that can be used. For example, authentication circuit 308 may verify the decrypted code through any protocol, steps, or process for determining whether the decrypted code corresponds to an authorized card 102.

Figure 5:
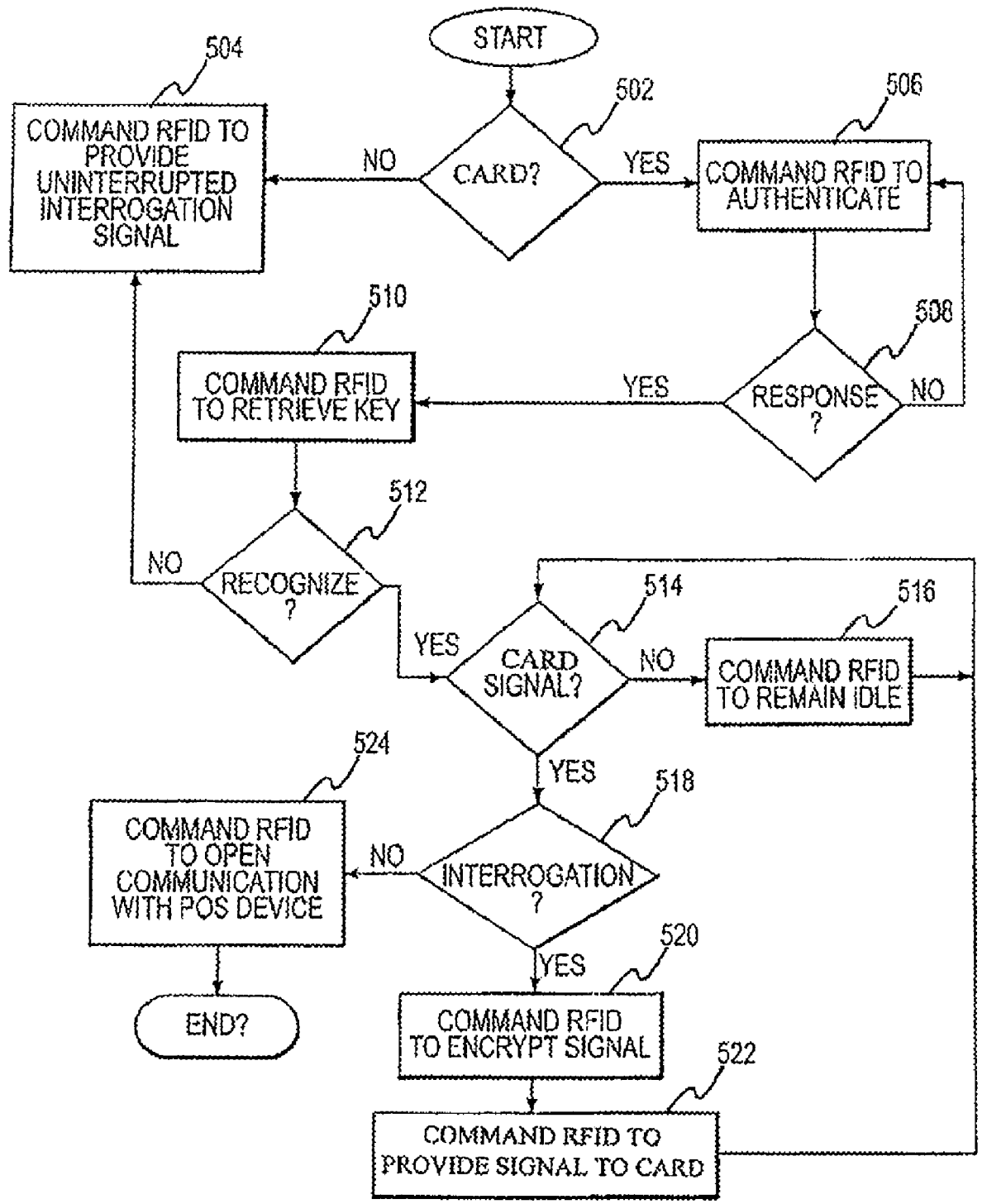
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of the RFID reader/magnetic stripe reader 104 components. For example, FIG. 5 illustrates and exemplary decision process under which protocol/sequence controller 314 may operate. Protocol/sequence controller 314 may command the different components of RFID reader/magnetic stripe reader 104 based on whether a card 102 is present (step 502). For example, if a card 102 is not present, then protocol/sequence controller 314 may command the RFID reader/magnetic stripe reader 104 to provide an uninterrupted interrogation signal (step 504). That is, the protocol/sequence controller may command the authentication circuit 308 to provide an uninterrupted interrogation signal until the presence of a card 102 is realized. If a card 102 is present, the protocol/sequence controller 314 may command the RFID reader/magnetic stripe reader 104 to authenticate the card 102 (step 506).

As noted above, "authentication" may mean that the protocol/sequence controller 314 may command the authentication circuit 308 to provide card 102 with an authorization code. If a response is received from card 102, protocol/sequence controller may determine if the response is a response to the RFID reader/magnetic stripe reader 104 provided authentication code, or if the response is a signal requiring authentication (step 508). If the signal requires authentication, then the protocol/sequence controller 314 may activate the authentication circuit as described above (step 506). On the other hand, if the card 102 signal is a response to the provided authentication code, then the protocol/sequence controller 314 may command the RFID reader/magnetic stripe reader 104 to retrieve the appropriate security key for enabling recognition of the signal (step 510). That is, the protocol/sequence controller 314 may command the authentication circuit 308 to retrieve from database 310 a security key (e.g., transponder system decryption key), unlock the signal, and compare the signal to the signal provided by the RFID reader/magnetic stripe reader 104 in the authentication process (e.g., step 506). If the signal is recognized, the protocol/sequence controller 314 may determine that the card 102 is authorized to access the system 100. If the signal is not recognized, then the card is considered not authorized. In which case, the protocol/sequence controller 314 may command the RFID controller to interrogate for authorized cards (step 504).

As shown in FIG. 4A, reader 114 reads information from magnetic stripe 142 of card 102 (step 422), and compares that information with corresponding information that has been received wirelessly from card 102 (step 424). If the two match (step 426), then the magnetic-stripe information is considered to have been verified, authentication is deemed fully successful (step 428), and the transaction is finally permitted to proceed (step 430). If this comparison reveals a non-match, however, the transaction is terminated (step 432), and the merchant is provided with a prompt to confiscate card 102 (step 434). It is simple for this verification processing to check that the magnetic-stripe information is identical to the contactless information, but the verification processing is not limited to this test. Other tests may be substituted. For example, reader 114 may require the contactless account number to differ from that read from magnetic stripe 142 by a pre-set amount, or to differ by an amount that varies with the day of the week or the date of the month or some other variable. Still other tests are also within the broad scope of the invention, such as requiring that certain bits of the contactless account number, when expressed in binary form, are each complementary to the corresponding bits of the magnetic-stripe account number, or the relation required might be that certain digits of one are the 9's complements of the corresponding digits of the other. These are merely examples, however, and any suitable test may be used without departing from the broad scope of the invention.

While the process is illustrated in FIG. 4A as requiring a match between the information read from magnetic stripe 142 and the corresponding information read contactlessly, it is also within the scope of the invention to require some other predetermined relation between the two corresponding pieces of information.

Once the protocol/sequence controller determines that the card 102 is authorized, the protocol/sequence controller 314 may seek to determine if additional signals are being sent by card 102 (step 514). If no additional signal is provided by card 102, then the protocol/sequence controller 314 may provide all the components of RFID reader/magnetic stripe reader 104 to remain idle until such time as a signal is provided (step 516). Contrarily, where an additional card 102 signal is provided, the protocol/sequence controller 314 may determine if the card 102 is requesting access to the merchant point of sale terminal 110 (e.g., POS device) or if the card 102 is attempting to interrogate the RFID reader/magnetic stripe reader 104 for return (e.g., mutual) authorization (step 518). Where the card 102 is requesting access to a merchant point of sale terminal 110, the protocol/sequence controller 314 may command the RFID reader to open communications with the point of sale terminal 110 (step 524). In particular, the protocol/sequence controller may command the point of sale terminal communications interface 312 to become active, permitting transfer of data between the RFID reader/magnetic stripe reader 104 and the merchant point of sale terminal 110.

On the other hand, if the protocol/sequence controller determines that the card 102 signal is a mutual interrogation signal, then the protocol/sequence controller may command the RFID reader/magnetic stripe reader 104 to encrypt the signal (step 520). The protocol/sequence controller 314 may command the encryption authentication circuit 318 to retrieve from database 320 the appropriate encryption key in response to the card 102 mutual interrogation signal. The protocol/sequence controller 314 may then command the RFID reader/magnetic stripe reader 104 to provide the encrypted mutual interrogation signal to the card 102. The protocol/sequence controller 314 may command the authentication circuit 318 to provide an encrypted mutual interrogation signal for the card 102 to mutually authenticate. Card 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of card 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted card account number. Upon appropriate request from protocol/sequence controller 314, encryption/decryption component (e.g., circuitry 318) may retrieve the appropriate security key, decrypt the card account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where the POS device 110 receives a response from network 112 (e.g., transaction authorized or denied), protocol/sequence controller 314 may provide the network response to the RF module 302 for optically and/or audibly communicating the response to the card 102 user.

RFID reader/magnetic stripe reader 104 may additionally include a USB interface 316, in communication with the protocol/sequence controller 314. In one embodiment, the USB interface may be a RS22 serial data interface. Alternatively, the RFID reader/magnetic stripe reader 104 may include a serial interface such as, for example, a RS232 interface in communication with the protocol/sequence controller 314. The USB connector 316 may be in communication with a personalization system 116 for initializing RFID reader/magnetic stripe reader 104 to system 100 application parameters. That is, prior to operation of system 100, RFID reader/magnetic stripe reader 104 may be in communication with personalization system 116 for populating database 310 with a listing of security keys belonging to authorized cards 102, and for populating database 320 with the security keys to decrypt the card 102 account numbers placing the account numbers in ISO/IEC 7813 format. In this way, RFID reader/magnetic stripe reader 104 may be populated with a unique identifier (e.g., serial number) which may be used by card authentication circuitry 210 to determine if RFID reader/magnetic stripe reader 104 is authorized to receive a card 102 encrypted account number.

Figure 6:
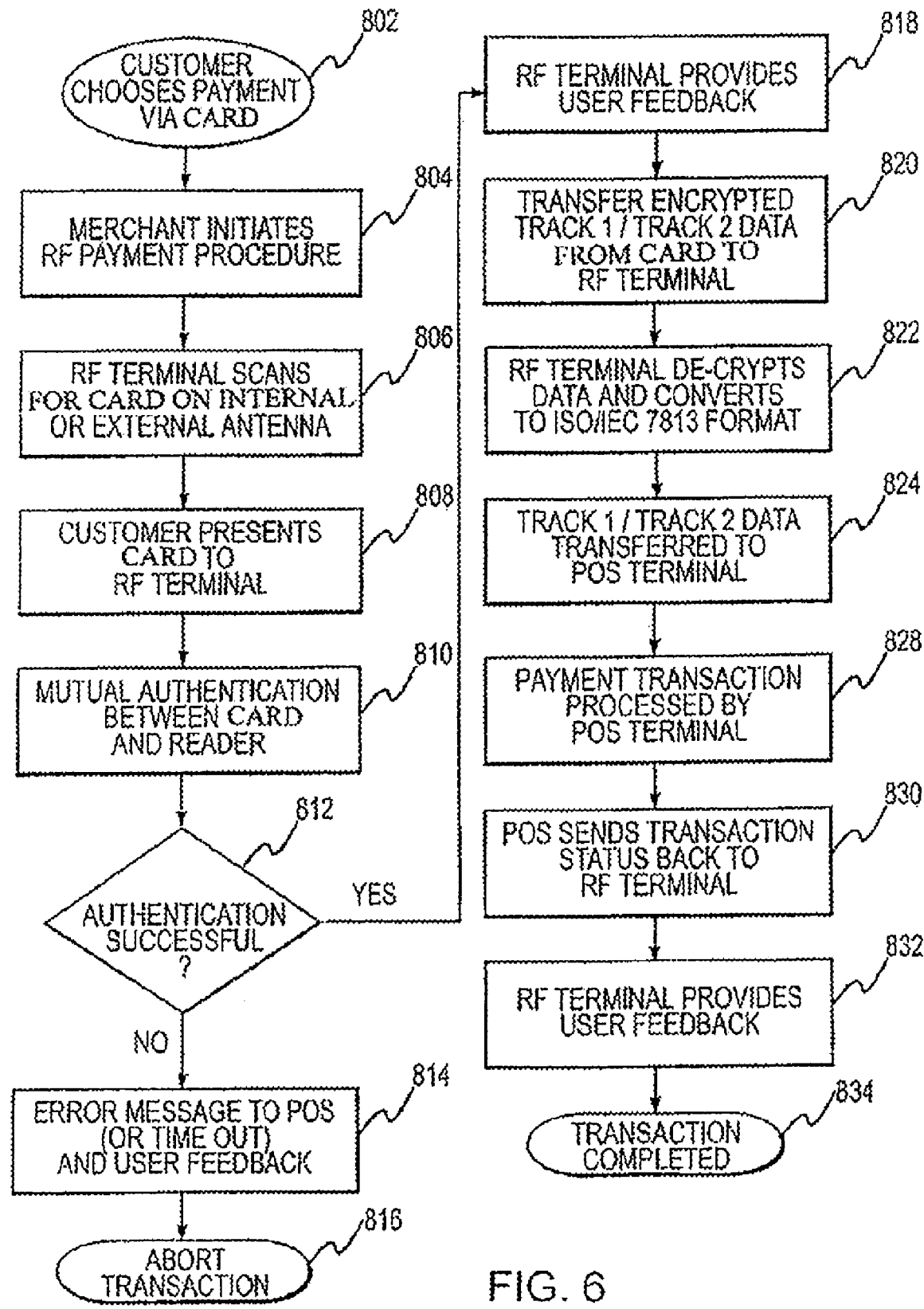
FIG. 6 is a flow diagram of an exemplary payment/transaction process in accordance with the present invention.

FIG. 6 illustrates an exemplary flow diagram for the operation of system 100A. The operation may be understood with reference to FIG. 1, which depicts the elements of system 100A which may be used in an exemplary transaction. The process is initiated when a customer desires to present a card 102 for payment (step 802). Upon presentation of the card 102, the merchant initiates the RF payment procedure via an RFID reader/magnetic stripe reader 104 (step 804). In particular, the RFID reader sends out an interrogation signal to scan for the presence of card 102 (step 806). The RF signal may be provided via the RFID reader antenna 106 or optionally via an external antenna 108. The customer then may present the card 102 for payment (step 808) by swiping the card 102 in a conventional magnetic stripe reader slot of the RFID reader/magnetic stripe reader to read the magnetic stripe Track 1/Track 2 data, and at the same time, the card 102 is activated by the RF interrogation signal provided.

The card 102 and the RFID reader/magnetic stripe reader 104 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 814), the RFID reader/magnetic stripe reader 104 may provide the customer with an appropriate optical and/or audible message (e.g., "transaction processing" or "wait") (step 818). The card protocol/sequence controller 208 may then retrieve from database 214 an encrypted card account number and provide the encrypted account number to the RFID reader/magnetic stripe reader 104 (step 820).

The RFID reader/magnetic stripe reader 104 may then decrypt the account number and convert the account number into magnetic stripe (ISO/IEC 7813) format (step 822), compare the converted data to the data read from the magnetic stripe, and provide the unencrypted account number to the merchant system 130 (step 828). In particular, the account number may be provided to the POS 110 device for transmission to the merchant network 112 for processing under known business transaction standards. The POS device 110 may then send an optical and/or audible transaction status message to the RFID reader/magnetic stripe reader 104 (step 830) for communication to the customer (step 832).

As was stated, card 102 can optionally have the ability to replace certain of the account data stored in card 102, in particular the account number, with newly generated data, for still greater security. For this purpose there is stored in card 102 a set of one or more numbers, which will hereinafter be termed "starting numbers". These starting numbers are used according to any of a number of algorithms to generate successive new account numbers.

As is well known, standard financial instruments have card numbers that typically double as the holder's account number, and that may haveسixteen digits. Several of these digits conventionally identify the issuer of the card, and the combination of the others is unique to the individual card in question. With conventional technology, this account number is fixed at the time the card is issued, and does not change thereafter, unless the card is lost, stolen or returned by the holder when the account is closed. In each of these situations, the existing card ceases to be active, and if the account is not closed, a new card, presumably with a new account number, is issued in its place. According to the present invention, in contrast, this account number is changed from time to time during the life of the card, preferably after each use of the card. It is also within the scope of the invention, however, that each number is valid for a pre-set length of time rather than for a single use or a pre-set number of uses.

Thus, the user of card 102 may activate card 102 using switch 230 when it is desired to make a transaction. Upon activation, processor 148 accesses the starting numbers, and follows a pre-programmed algorithm to generate a new account number. As mentioned, several of the digits cannot be changed, because they are determined by the identity of the card issuer. The rest of the digits, or any predetermined subset thereof, can be changed. The new account number is displayed on display 140, and the card is presented to the merchant in the conventional way. If the transaction is being performed over the telephone or the Internet, then the card information, including the displayed new account number, is provided orally or by being typed in.

The security of using the card of the present invention is increased by the generation of a new account number for the card at certain times, as will now be described.

When the card is activated, the card's internal processor activates the display, which (in this embodiment) shows the card-holder's name, and the expiration date of the card. Initially, however, the account number may not be displayed. Instead, the processor generates a new account number, and upon the completion of this process, causes the new account number to be displayed under control of display controller 144, and causes the new number to be stored in non-volatile memory. In addition, the circuitry mentioned above that permits at least some of the contents of magnetic stripe 142 to be rewritten, is controlled by processor 148 to rewrite the account number in the stripe, so that the only account number stored in magnetic stripe 142 is now the new number. The card is then used to complete the transaction in the same manner as would be done using a conventional wireless card. If the transaction is being performed on a merchant's premises, the card-holder presents the card to the merchant, and the card information is provided by the card wirelessly to the merchant's RFID reader. The new account number is the only account number provided to the RFID reader, and hence is the account number used by the issuer in determining whether to authorize the transaction, as will be described below. The next time the card is activated and used, yet another new account number will be generated and used. Thus, once the user deactivates the card, or the card is turned off automatically by the processor after the lapse of a certain amount of time without interacting with a RFID reader, no further use is made of the current account number.

Similarly, if the transaction is being performed via telephone or Internet, the newly generated account number displayed on the card is provided to the merchant over the telephone or is typed in and provided to the merchant's website. Again, only this newly generated account number is used by the issuer to determine whether or not to authorize the transaction, and once the card is subsequently deactivated, this account number is not used further.

Before the description proceeds to methods by which the foregoing generation of new account numbers is performed, it is noted that it is within the scope of the invention for card 102 to be used with more than one account. In such instance, the display may initially display a list of account names, icons, or other identifiers from which the user may make a selection, to specify which account is to be utilized at present. Such list may take the form of displaying identifiers of the accounts at once, or of a scrolling of the identifiers of the accounts, or any other convenient form.

There will now be described several examples of techniques that can be used for generating the new account numbers. The same technique is used at the issuer's side as by the card, with appropriate synchronization between the two if necessary, so that at any given time, the issuer knows what account number should be presented by the user of that particular card the next time that card is used in a transaction.

As explained above, the account number contains several digits that should not be changed, as they identify the relevant bank. Also, the last digit is used as a check-sum digit, and so will have its value by the other fifteen digits of the new account number. Thus, only a certain number of the digits will actually be changed.

In a first technique, assume by way of example that four digits are to be changed each time a new account number is needed. In this technique, the four digits are treated as being a four-digit number, and that number is incremented by a value stored in the card's memory. However, the memory is provided with not just a single such incremental value, but with a large number thereof, which are used in an order which itself is specified by the card circuitry or software. Thus, each new account number differs from its predecessor, but since a different increment is used each time a new account number is produced, it is difficult for a thief to predict what the next new number will be even if he is able to learn what account number was used in a recent transaction, or in several recent transactions. At the issuer side, of course, the same set of incremental values is available, and is associated with the particular card/user in question, and thus the issuer is able, each time authorization for a transaction is requested, to know what the current account number should be.

In another approach, the incremental values are not pre-stored in the card, but are calculated when needed. For this purpose the card is provided with a pseudo-random number generator, which uses an input value to generate a series of output numbers the values of which vary in an extremely complicated way with the input value, and with previous output values. The series of output values thus gives the appearance of being random, although it is not, and these values are used as the incremental values, giving the successive changes to the account number the appearance of randomness, as well.

In this approach, the issuer uses an identical pseudo-random number generator and the same input number to generate the same series of incremental values, and thus again knows what the current correct account umber is.

More-complex approaches can be adopted. As one example, the card may store not one but several such input values for use with the pseudo-random number generator, with the various input values being selected for use in a predetermined (pre-stored) order. Again, the issuer uses the same pseudo-random number generator, and the same input values, in the same order, to know at all times what the current correct account number is.

Further variations are possible. For example, the six-digit portion of the account number that is to be changed, is itself used as the input value for the pseudo-random number generator. Again, a computation may be performed using that four-digit portion and, for example, the date at the card-user's location, and then the result of that combination is used as the input value for the pseudo-random number generator. One example would be perhaps to multiply the date, written as six digits (DDMMYY) by the four-digit portion of the account number that is to be changed, and using the first four digits of the product as the input value for the pseudo-random number generator. (In this technique, it may be necessary for the issuer to be able to identify the card user's local time from the identity of the merchant where the card is being presented, or by asking the user to provide that information if the transaction is via telephone or Internet.) Many other specific approaches can be used to make it difficult for a would-be thief to predict correctly what the next account number will be on the basis of any number of old ones.

In another embodiment that is within the broad scope of the invention, the card does not generate a new account number each time the card is activated, but after every second, or every third activation (more generally, after each Nth activation, where N is a natural number set by the issuer). Again, it is within the broad scope of the invention for the account number to be replaced upon actuation of the card only if a pre-set certain amount of time has elapsed since the last generation of a new account number.

As described above, it is preferred that the new account number is stored in both the magnetic stripe and the electronic memory. This permits the processing shown in FIG. 4A to be used to compare the new account number as read both wirelessly and from the magnetic stripe 142.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents. It is also to be understood that the steps and processes recited in the claims need not be performed in the order presented.

The invention claimed is:

1. A transaction device comprising:
   a radio frequency (RF) communication system operable to communicate account data, wherein the account data comprises a previous account number generated, at least partially, by the transaction device;
   a processor configured to:
   generate a set of data based at least in part on a portion of the previous account number, and
   replace only a portion of the previous account number with the set of data thereby generating a new account number, with a portion of the new account number remaining the same as the previous account number.

2. The transaction device of claim 1, further comprising an on-board power source.

3. The transaction device of claim 1, further comprising means for rewriting at least a portion of the account data stored in a magnetic stripe on the transaction device.

4. The transaction device of claim 3, wherein the account data stored in the magnetic stripe comprises an account number having plural digits, and wherein the means for rewriting is arranged for rewriting at least four predetermined ones of the digits of the account number.

5. The transaction device of claim 1, wherein the account data is compatible with Track 1/Track 2 format.

6. The transaction device of claim 1, further comprising a magnetic stripe.

7. The transaction device of claim 1, further comprising a magnetic stripe configured to store the account data in magnetic stripe Track 1/Track 2 format.

8. The transaction device of claim 1, wherein the magnetic stripe Track 1/Track 2 format complies with ISO/IEC 7813.

9. The transaction device of claim 1, wherein the processor is configured to produce a new account number each time a response signal is sent in response to a signal received by the transaction device from a reader.

10. The transaction device of claim 1, further comprising a display configured to display the account number, prior to production of the new account number, and to display the new account number, once the new account number has been produced.

11. The transaction device of claim 10, wherein the display becomes active to display the new account number only in response to actuation of a switch.

12. The transaction device of claim 1, wherein the RF communication system is further operable to receive an authentication signal from a reader.

13. The transaction device of claim 1, wherein the RF communication system is further operable to receive an interrogation signal from a reader.

14. The transaction device of claim 1, further comprising a transaction completion system operable to receive account data from a reader in magnetic stripe Track 1/Track 2 format.

15. The transaction device of claim 1, further comprising means for rewriting at least a portion of the account data stored in a magnetic stripe on the transaction device,
   wherein a reader is operable to compare the account data received via RF communication from the transaction device with the account data read from a magnetic stripe of the transaction device, and
   wherein the reader is constructed to compare the account data received via RF communication from the transaction device with the account data read from the magnetic stripe of the transaction device only after the new account number has been stored in the transaction device memory and the means for rewriting has rewritten the at least a portion of the account data stored in the magnetic stripe, and wherein the reader uses the result of comparing to verify that the account data received by RF communication and the account data read from the magnetic stripe are valid.

16. The transaction device of claim 3, wherein the previous account number has plural digits, and wherein the means for rewriting is arranged for rewriting at least four predetermined ones of the digits of the previous account number.

17. A method comprising:
   generating, by a computer-based system for generating an account number, a set of data based at least in part on a portion of a previous account number;
   replacing, by the computer-based system, only a portion of the previous account number with the set of data thereby generating a new account number, with a portion of the new account number remains the same as the previous account number; and
   transmitting, by the computer-based system, the new account number to an account reader.

18. The method of claim 17, wherein magnetic-stripe account data is read from a magnetic stripe associated with the computer based system, and wherein the new account number is compared and verified with the magnetic-stripe account data.

19. The method of claim 17, further comprising at least one of rewriting and dynamically changing at least a portion of magnetic-stripe account data.

20. The method of claim 17, further comprising causing the previous account number to be replaced with the new account number after producing the new account number.

* * * * *